No. 821,738. PATENTED MAY 29, 1906.
L. A. PRATT.
MOLD FOR CONCRETE POSTS.
APPLICATION FILED DEC. 2, 1905.
2 SHEETS—SHEET 2.
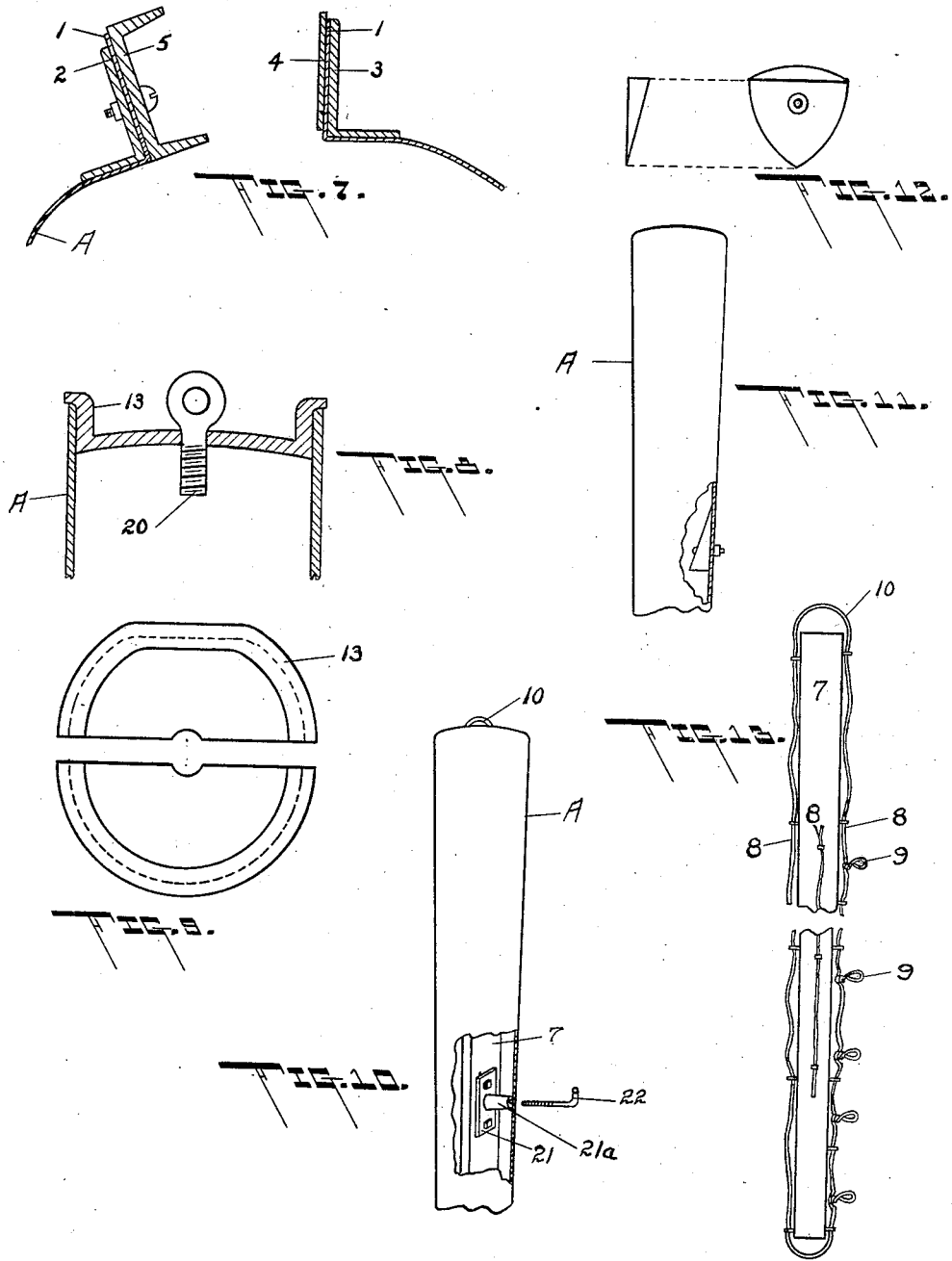
WITNESSES:
Roy Wallis.
A. A. Easterly
Leverett A. Pratt, INVENTOR
BY
Geo. B. Willcox, ATTORNEY

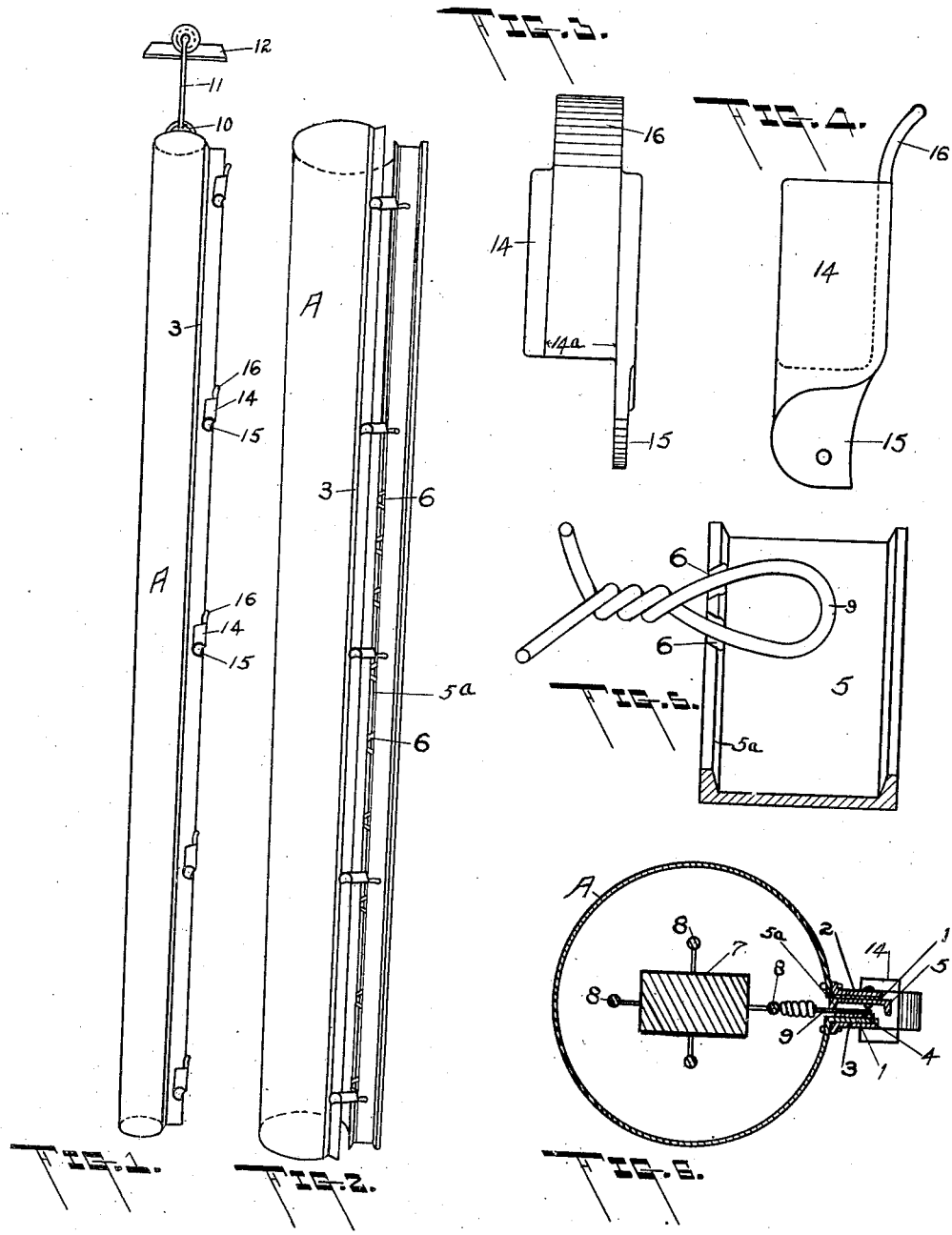

UNITED STATES PATENT OFFICE.

LEVERETT A. PRATT, OF BAY CITY, MICHIGAN.

MOLD FOR CONCRETE POSTS.

No. 821,738.　　　Specification of Letters Patent.　　　Patented May 29, 1906.

Application filed December 2, 1905. Serial No. 289,988.

*To all whom it may concern:*

Be it known that I, LEVERETT A. PRATT, a citizen of the United States, residing at Bay City, in the county of Bay and State of Michigan, have invented certain new and useful Improvements in Molds for Concrete Posts; and I do hereby declare the following to be a full, clear, and exact description of the invention, such as will enable others skilled in the art to which it appertains to make and use the same.

My invention relates to a mold, and in that particular embodiment herein set forth I have disclosed my invention as applied to a mold for manufacturing fence-posts and similar articles, though it is by no means confined to this employment, the drawings illustrating but one of a number of constructions which might be formed to embody the invention.

One object of my invention is the provision of a suitably-supported mold which will not impose any lateral strain on the article during the molding process.

Another object of my invention is the provision of a mold which can be easily and quickly released from the article being molded without injury to the article.

Still further objects are the provision of a mold which greatly cheapens the cost of manufacture of the articles molded, as well as occupying but little space and capable of being handled with ease and despatch.

Another object of the invention is the provision of a mold the construction of which is such as to eliminate the unsightly seams so often found in molded articles.

To these ends my invention consists of a mold which in the present instance is adapted to automatically release itself from the article being molded when the mold is unlocked.

My invention also contemplates means for suspending the core in an upright or vertical position and so arranging the flask that it will be suspended from the core while the material is being put into the flask. Therefore the core during the process of filling supports the flask and the liquid cement or other plastic material. When the cement has set, the flask is removed, leaving the green post suspended by means of the core. In this condition the post remains until it is thoroughly seasoned. I thereby avoid the necessity of handling the post at any time during the process of molding and seasoning, and by this means I avoid all liability of breakage, which has heretofore been a serious detriment to the manufacture of cement posts, it having been customary to take the posts from the flasks before they are thoroughly seasoned and lay them out horizoutally on pallets or tablets to complete the seasoning process. Such handling necessarily involved considerable loss through breakage.

My invention further consists in certain other novel features and combinations of parts or their equivalents, which will be more fully described hereinafter and particularly pointed out in the claims.

In the accompanying drawings, Figure 1 is a side view showing the mold in closed position. Fig. 2 is a similar view showing the mold in its open position. Fig. 3 and Fig. 4 are front and side views, respectively, of a locking means, such as a latch, for retaining the mold in closed position. Fig. 5 is a detail view showing the manner of connecting the core and mold, whereby the latter is supported. Fig. 6 is a horizontal cross-sectional view showing the manner of connecting the core and mold. Fig. 7 is a detail view in cross-section of a portion of the mold. Figs. 8 and 9 are detail views in section and top plan, respectively, showing the sectional cap. Fig. 10 is a view, partly broken away, showing a means for embedding a socket in the molded article. Fig. 11 is a view showing the means for forming notches in the post or molded article. Fig. 12 is a detail view of the lug, and Fig. 13 is a side view of the core.

In that embodiment of my invention herein illustrated, which discloses one of a number of constructions in which my invention may be incorporated, A indicates the body of the mold, which may be cylindrical or tapered, as preferred, and is divided or slotted longitudinally of its length, as shown in Fig. 2. When the tapered flask or mold, which is my preferred construction, is used, the material as it is poured in at the top tamps itself and forms a solid coherent mass, the greater weight being at the upper larger end of the flask.

The material of which the mold is composed is preferably resilient—that is to say, the longitudinal edges of the mold are normally located apart from each other, and when the edges are brought together their tendency is to spring apart, thus forming an expansible mold capable of contraction. Furthermore, this mold is one-part, as d tinguished from a two-part mold, whereby a much neater article is produced and the objectionable seams avoided.

The opposing longitudinal edges of the mold may be conveniently outturned to form the flanges 1 1, to the outer faces of which flanges are preferably secured the angle-irons 2 3, for the purpose of strengthening the mold and imparting sufficient rigidity thereto. It is desirable to provide the inner face of one of the flanges 1 with a filling-piece—as, for instance, a longitudinally-extending strip 4, the flange preferably being held between the strip and the angle-iron 3. The inner face of the opposite flange preferably has secured thereto a channel-iron 5 or other suitable member adapted to receive the strip 4, for a purpose hereinafter set forth, said channel-iron having its inner rib 5$^a$ provided with grooves or recesses 6 6, which in the present instance are shown as being convergent, though this is not at all necessary, the grooves adapted to receive projections from the core in the present instance, the loops hereinafter referred to and being of equal or greater depth than the cross-sectional area of the material of which the loops are formed.

The mold is adapted to receive a suitable core of any convenient construction, that shown comprising a strengthening member 7, provided with longitudinally-extending crimped strips 8, spaced apart from and extending approximately parallel with the strengthening member, one of said strips being conveniently provided with laterally-projecting loops 9 9, the loops adapted to be received in the chamber formed by the channel-iron and lie within the grooves or recesses 6 6. One end of the core, preferably the upper thicker end, is provided with a loop 10, which may be conveniently supported by a hook 11, traveling on a rail 12 or other equivalent structure. A cap 13, of a shape conforming to the cross-sectional area of the mold when closed or contracted, is provided for the opposite lower end of the mold, such cap being of any suitable construction and adapted to prevent the escape of the plastic material introduced into the mold from the upper end.

As one means for retaining the mold in closed or contracted position I provide the latches 14 14, each of which consists of a rectangular body portion, one longitudinal face of which is provided with a wedge-shaped groove, the widest portion of the groove 14$^a$ being at the heel of the latch, where it will first engage the opposing flanges of the mold. A tailpiece 15 projects rearwardly from one side face of the heel of the body portion and is pivotally secured to the angle-iron 3, for instance. A thumb-piece 16 extends forwardly from the top face of the toe of the body portion, said thumb-piece being curved upwardly to facilitate the actuation of the latch.

In operation the mold being in its open position receives the core, the loops 9 9 of which are placed in the grooves 6 6 in the manner shown in Fig. 5. The cap is then applied to one end of the mold, as shown in Fig. 8, and the mold is closed by springing the opposite walls of the slot together, whereby the filling-piece 4 is received in the chamber of the channel-iron 5 and lies against the loops 9 9 to hold the latter in their grooves 6 6, the grooved edge of the channel-iron tightly fitting against the opposite wall or flange 1 to prevent the escape of plastic material into the channel of the channel-iron. When the longitudinal edges of the mold are snugly together, as shown in Fig. 6, the latches are swung into position, the widest portion of the groove at the heel of each latch first engaging the opposite side of the slot in the mold, and as the latches are forced over to embrace the walls of the slot the gradually-narrowing groove operates to draw the walls together and form a tight joint to prevent the formation of a seam in the article being molded and lock the mold in contracted position. The loops 9 9, lying in the channel-iron, are thus isolated from the plastic material, so that they will project from the article when completed, and, furthermore, the core is thereby firmly clamped to the mold to afford a support for the latter. The mold may now be suspended by means of the loop 10, carried by the core, and the plastic material is introduced into the mold in any suitable manner, the cap 13 at the lower end preventing the escape of the plastic material and permitting it to settle firmly around the core. The mold is retained in suspended position until the material has become properly set, whereupon the latches may be swung outwardly to release the opposing edges of the mold and permit the latter to automatically release itself from the article being molded by means of the inherent resiliency of the mold which is now in readiness to be used in forming another article of the same character. When the mold is released, the plug or cap at the bottom of course drops out, since it is only clamped therein by being gripped by the lower end of the flask. The molded article may remain suspended from the hook 11 by means of which it is conveyed to any suitable place and left to become seasoned, and hence the handling of the seasoned article is avoided nor is the use of pallets or tablets required. The interior of the mold prior to the introduction of the plastic material may be coated with any suitable substance whereby to prevent the material from adhering to the interior of the mold. It is also possible to remove the channel-iron 5 and substitute another having its grooves 6 6 spaced farther from or nearer to each other, if desired, the channel-irons being removably secured to the flask.

In Figs. 8 and 9 is shown one means for enabling an eyebolt, staple, or other projection to be molded into the top of the article, and to effect this I preferably make the cap 13 of at least two sections, the meeting edges of the sections being correspondingly recessed to form an aperture, through which aperture extends the bolt 20. When the posts are to be used as gate-posts or to be supplied with means for securing any form of fastening—such as hinges, hooks, or staples—thereto, it is desirable to provide means for readily attaching such a fastening to the post. As one form of such means I have illustrated in Fig. 10 a socket which is preferably secured to the core before the post is molded and is embedded in the post, the end of the socket, which is preferably provided with screw-threads to receive the screw-bolt, being flush with the outer face of the post. This socket is preferably, but not necessarily, made in the form shown in Fig. 10, in which 21 is the base of the socket, which may be secured, by means of screws or otherwise, to the side of the core 7, and 21ª is a hollow boss extending radially from the base to the outer shell of the mold. The boss is internally threaded to receive the screw-bolt 22 or other appliance which it is desired to fasten to the post. Sometimes it is desirable to form a notch or shoulder in the molded article to receive the ends of braces, and as one of a number of means for attaining this result I have in Fig. 11 shown the flask provided with a suitably-formed lug removably secured to the interior face of the flask and adapted to be carried therewith when the flask is released from the molded article, the expanding movement of the flask when the catches are released operating to withdraw the lug from the molded article to leave a clear impression therein corresponding to the shape of the lug.

It is evident that many changes might be made in the forms and arrangements of the various parts described without departing from the spirit and scope of my invention, and hence I do not desire to limit myself to the construction herein set forth.

Having thus fully described my invention, what I claim as new is—

1. A flask comprising a one-part integrally-formed mold-body slotted longitudinally of itself, the walls of the slot being flanged outwardly and normally tending to lie apart from each other, and reinforcing members carried by the flanged walls.

2. A flask comprising a one-part integrally-formed mold-body slotted longitudinally of itself, the walls of the slot being flanged outwardly and normally tending to lie apart from each other, and reinforcing members carried by the flanged walls, one of the members provided with slots formed therein to receive projections from the core.

3. A flask comprising a one-part integrally-formed mold-body slotted longitudinally of itself, the walls of the slot being flanged outwardly and normally tending to lie apart from each other, and reinforcing members carried by the flanged walls, one of said reinforcing members being grooved to receive the opposite reinforcing member.

4. A flask comprising a one-part integrally-formed mold-body slotted longitudinally of itself, the walls of the slot being flanged outwardly and normally tending to lie apart from each other, and reinforcing members carried by the flanged walls, one of said reinforcing members being grooved to receive the opposite reinforcing member, and provided with recesses to receive projections on the article being molded, the opposite reinforcing member adapted to engage said projections.

5. The combination with a core capable of suspension at its upper end, of a mold adapted to inclose the core and means carried by the core and engaged by the mold for supporting the mold.

6. A flask comprising a slotted mold-body, the walls of the slot projecting outwardly and adapted to lie adjacent each other, and latches pivoted at one end to one of the walls of the slot, the latches each provided with a wedge-shaped groove, the widest portion of which is nearest the pivotal point of the latch.

7. A flask comprising a longitudinally-slotted mold-body, a core received therein, projections carried by the core, a reinforcing member removably secured to one wall of the slot and provided with recesses set a predetermined distance apart to receive the projections of the core.

8. The combination with a suitable core, and projections therefrom, of a longitudinally-slotted mold, a channel-iron carried by one wall of the slot, the inner rib of such iron being recessed to receive the projections, a filling-piece carried by the opposite wall of the slot, and receivable within the channel-iron to engage the projections and means for retaining the walls of the slot together.

9. The combination with a flask having an opening at one end, and a core receivable in the flask, of a cap for one end of the flask, the cap comprising a plurality of sections, the meeting edges of the sections being correspondingly recessed and a projection permanently carried by the core and extending into the aperture formed by the registering recesses when the sections of the cap are assembled.

10. The combination with an expansible flask, of a projecting member removably secured to the inner face and of less length than the flask to leave a brace-receiving recess in the article molded.

11. A flask comprising a mold-body formed of resilient material and longitudinally slotted, the walls of the slot normally tending at all times to lie apart from each other, means for retaining the walls of the slot together, a core received in the mold-body and forming a part of the article molded, means connecting the core and mold-body, means on the core for permitting the suspension of the core and mold-body and a two-part cap for closing one end of the mold-body, the cap being grasped by the mold-body when in contracted position, and adapted to drop away from the molded article when the mold-body expands to its normal position.

12. The combination with a flask and a core receivable therein, of a member having a socket extending in a plane transverse to the longitudinal axis of the flask, said member mounted on the core and projecting therefrom, the outer open end of the socket member adapted to engage and be closed by the inner surface of the flask, when the latter is in closed position to prevent the access of the plastic material to the socket.

13. The combination with a flask and a core received therein, of a member carried by and projecting from the core in a plane transverse to the longitudinal axis of the core, the outer end of the member abutting and engaging the inner face of the flask to prevent access thereto of the material of which the article molded is composed, the member also being contained entirely within the contour of the article molded.

In testimony whereof I affix my signature in presence of two witnesses.

LEVERETT A. PRATT.

Witnesses:
MORRIS L. COURTRIGHT,
M. LETITIA SHANNON.